US012581419B2

(12) United States Patent
Yao et al.

(10) Patent No.: US 12,581,419 B2
(45) Date of Patent: Mar. 17, 2026

(54) PARAMETER RESETTING METHOD AND DEVICE, AND PARAMETER INFORMATION RECEIVING METHOD AND DEVICE

(71) Applicant: ZTE Corporation, Shenzhen (CN)

(72) Inventors: Ke Yao, Shenzhen (CN); Bo Gao, Shenzhen (CN); Zhaohua Lu, Shenzhen (CN); Chuangxin Jiang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 711 days.

(21) Appl. No.: 17/917,997

(22) PCT Filed: Mar. 26, 2021

(86) PCT No.: PCT/CN2021/083369
§ 371 (c)(1),
(2) Date: Oct. 10, 2022

(87) PCT Pub. No.: WO2021/203995
PCT Pub. Date: Oct. 14, 2021

(65) Prior Publication Data
US 2023/0143360 A1 May 11, 2023

(30) Foreign Application Priority Data
Apr. 10, 2020 (CN) .......................... 202010281615.1

(51) Int. Cl.
*H04W 52/08* (2009.01)
*H04W 52/24* (2009.01)
(52) U.S. Cl.
CPC ......... *H04W 52/08* (2013.01); *H04W 52/242* (2013.01)

(58) Field of Classification Search
CPC ............................ H04W 52/08; H04W 52/242
See application file for complete search history.

(56) References Cited

U.S. PATENT DOCUMENTS

| | | | |
|---|---|---|---|
| 2019/0364511 A1 | 11/2019 | Chen et al. | |
| 2020/0413345 A1* | 12/2020 | Yao | ........................ H04L 5/0048 |
| 2021/0050955 A1* | 2/2021 | Park | .................... H04B 7/0456 |

FOREIGN PATENT DOCUMENTS

| | | |
|---|---|---|
| CN | 102368868 A | 3/2012 |
| CN | 104010358 A | 8/2014 |

(Continued)

OTHER PUBLICATIONS

European Search Report for Application No. 21784278.0, dated Sep. 1, 2023, 11 pages.

(Continued)

*Primary Examiner* — Raymond S Dean
(74) *Attorney, Agent, or Firm* — CANTOR COLBURN LLP

(57) ABSTRACT
Provided are a parameter resetting method and device, and a parameter information receiving method and device. The parameter resetting method includes that: after a PL corresponding to updated PL-RS parameter information takes effect, or after a beam state corresponding to updated beam state information takes effect, relevant parameters of closed-loop power control are reset. The described technical solution solves problems in the related art, such as a problem that in a process where a new beam takes effect and the PL of an old beam is still used, the closed-loop power control is likely to accumulate a large negative value, causing the transmission power to drop suddenly after the PL of the new beam takes effect.

8 Claims, 3 Drawing Sheets

Resetting module 20

Parameter resetting device

(56)     References Cited

FOREIGN PATENT DOCUMENTS

| | | | |
|---|---|---|---|
| CN | 108134659 A | 6/2018 | |
| CN | 109803362 A | 5/2019 | |
| CN | 109803363 A | 5/2019 | |
| CN | 110167122 A | 8/2019 | |
| CN | 111867028 A | 10/2020 | |
| EP | 3512124 A1 | 7/2019 | |
| JP | 2019110757 A | 7/2019 | |
| WO | 2018128409 A1 | 7/2018 | |
| WO | 2019029381 A1 | 2/2019 | |
| WO | 2019090663 A1 | 5/2019 | |
| WO | WO-2019157895 A1 * | 8/2019 | ........... H04W 72/23 |

OTHER PUBLICATIONS

International Search Report for corresponding application PCT/CN2021/083369 filed Mar. 26, 2021; Mail date Jun. 15, 2021.
Chinese Office Action; Application No. 2020102816151 ; Filing Date: Apr. 10, 2020; 2 pages.
ZTE, Sanechips, "Summary for AI 7.1.6.1 NR UL power control in non-CA aspects," R1-1803282 3GPP TSG RAN WG1 Meeting #92, Mar. 2, 2018, 28 pages.

* cited by examiner

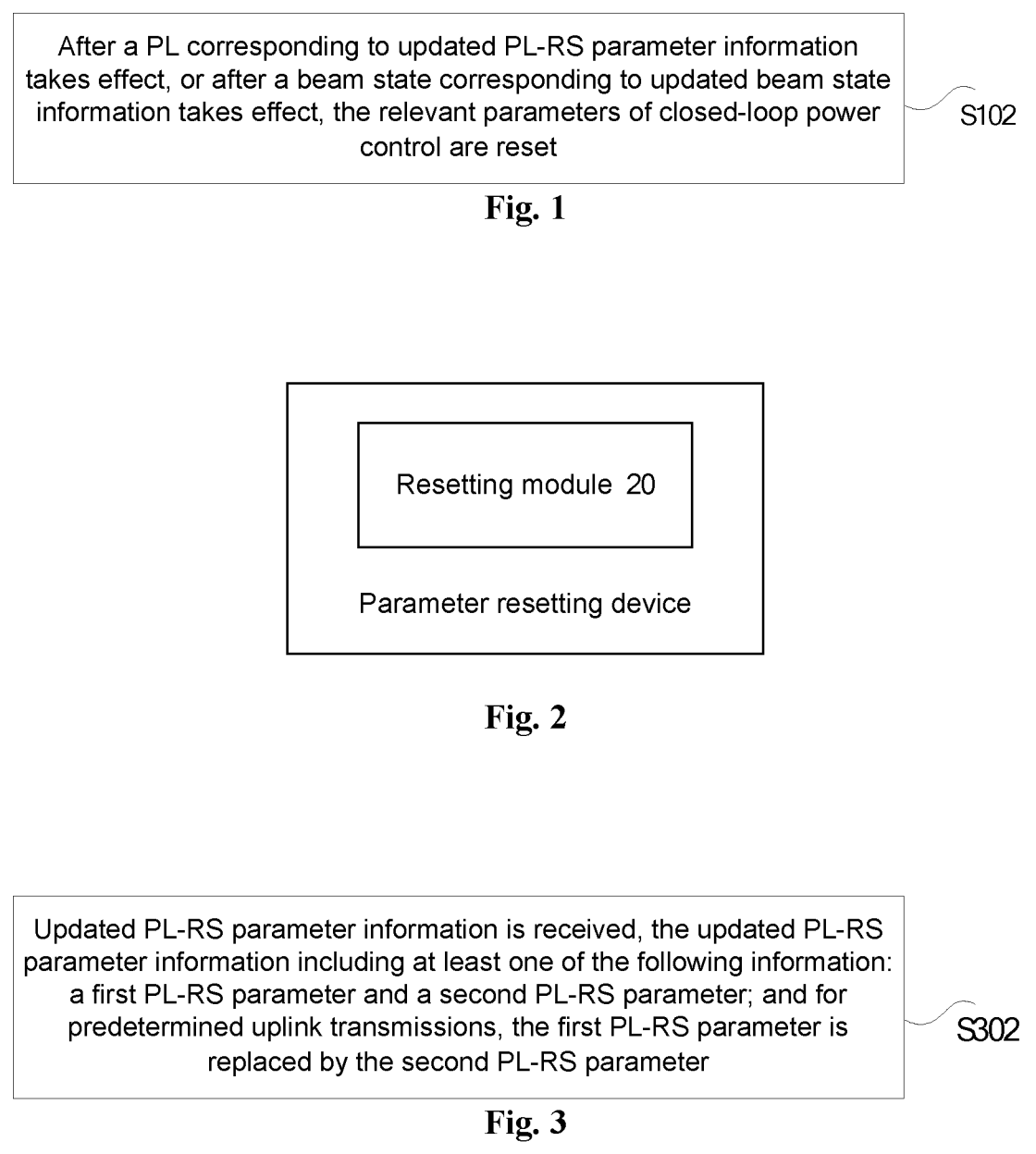

After a PL corresponding to updated PL-RS parameter information takes effect, or after a beam state corresponding to updated beam state information takes effect, the relevant parameters of closed-loop power control are reset

Resetting module  20

Parameter resetting device

Fig. 2

Updated PL-RS parameter information is received, the updated PL-RS parameter information including at least one of the following information: a first PL-RS parameter and a second PL-RS parameter; and for predetermined uplink transmissions, the first PL-RS parameter is replaced by the second PL-RS parameter

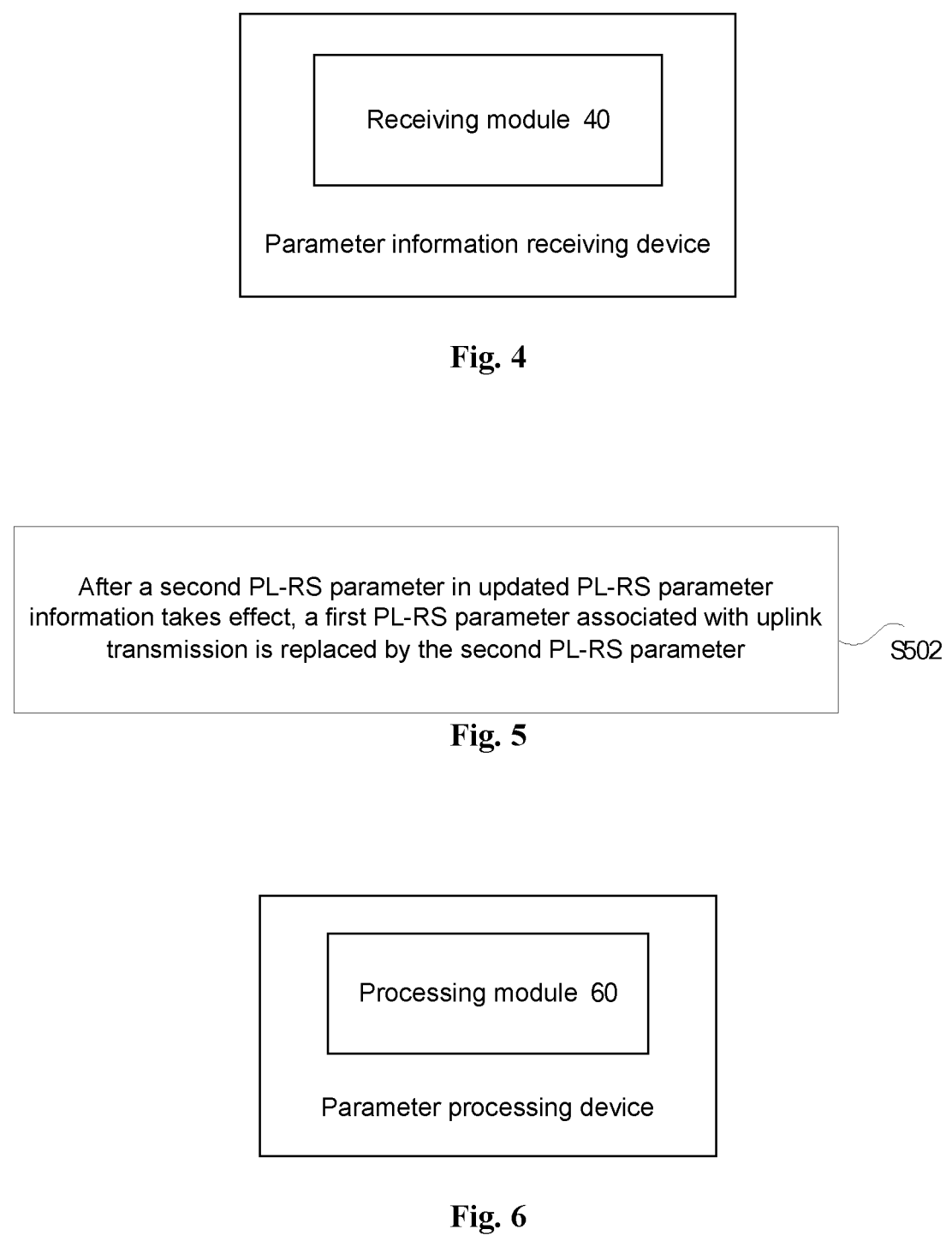

Receiving module  40

Parameter information receiving device

Fig. 4

After a second PL-RS parameter in updated PL-RS parameter information takes effect, a first PL-RS parameter associated with uplink transmission is replaced by the second PL-RS parameter     S502

Fig. 5

Processing module  60

Parameter processing device

Fig. 6

PARAMETER RESETTING METHOD AND DEVICE, AND PARAMETER INFORMATION RECEIVING METHOD AND DEVICE

CROSS-REFERENCE TO RELATED APPLICATION

The present disclosure claims priority to Chinese patent application No. CN202010281615.1, filed on Apr. 10, 2020, and entitled "Parameter resetting method and device, and parameter information receiving method and device", the disclosure of which is hereby incorporated by reference in its entirety.

TECHNICAL FIELD

The present disclosure relates to the field of communications, and in particular to a parameter resetting method and device, and a parameter information receiving method and device.

BACKGROUND

One of the key features of the New Radio (NR) technology of the fifth-generation mobile communication system is support for a high frequency band. The high frequency band has abundant frequency domain resources, but has a problem of small coverage due to the fast attenuation of wireless signals. Sending signals by means of beams may concentrate energy in a relatively small space, so as to improve the problem of coverage of signals in the high frequency band. In a beam scenario, a beam pair between a base station and UE may also change with time and location, so a flexible beam update mechanism is needed. When a communication beam changes, updating the beam and RS information (Path Loss-Reference Signal (PL-RS) parameter) for measuring the path loss of a corresponding link through an MAC Control Element (MAC CE) is more flexible than the update of high-level parameters. The solutions of the present disclosure are mainly used for solving problems existing in a mechanism for updating the PL-RS parameter through the MAC CE.

When the communication beam changes, the beam and the RS information (PL-RS parameter) for measuring the path loss of the corresponding link may be updated through the MAC CE. Because a Path Loss (PL) is a result of high-level parameter filtering and needs to be measured multiple times, a delay for the PL to take effect is larger than a delay for a new beam to take effect. In a process where a new beam takes effect and the PL of an old beam is still used, the closed-loop power control is likely to accumulate a large negative value, causing the transmission power to drop suddenly after the PL of the new beam takes effect.

For problems in the related art, such as a problem that in a process where a new beam takes effect and the PL of an old beam is still used, the closed-loop power control is likely to accumulate a large negative value, causing the transmission power to drop suddenly after the PL of the new beam takes effect, no effective solution has been proposed.

SUMMARY

Embodiments of the present disclosure provide a parameter resetting method and device, and a parameter information receiving method and device to at least solve problems in the related art, such as a problem that in a process where a new beam takes effect and the PL of an old beam is still used, the closed-loop power control is likely to accumulate a large negative value, causing the transmission power to drop suddenly after the PL of the new beam takes effect.

According to an embodiment of the present disclosure, a parameter resetting method is provided, which may include that: after a PL corresponding to updated PL-RS parameter information takes effect, or after a beam state corresponding to updated beam state information takes effect, relevant parameters of closed-loop power control are reset.

In the embodiment of the present disclosure, the updated PL-RS parameter information or the updated beam state information is carried through one of the following signaling: Radio Resource Control (RRC) signaling, MAC Control Element (MAC CE) signaling, and physical layer signaling.

In the embodiment of the present disclosure, the relevant parameters of closed-loop power control include a power control adjustment state corresponding to a closed-loop power control index.

In the embodiment of the present disclosure, that the closed-loop power control index is determined according to a PL-RS parameter to be activated in the updated PL-RS parameter information or a beam state parameter to be activated in the updated beam state information may include that: the closed-loop power control index is determined according to the index of the PL-RS parameter to be activated; or the closed-loop power control index is determined according to an association relationship between the PL-RS parameter to be activated and the closed-loop power control index; or the closed-loop power control index is determined according to the beam state parameter to be activated; or the closed-loop power control index is determined according to an association relationship between the beam state parameter to be activated and the closed-loop power control index.

In the embodiment of the present disclosure, the association relationship between the PL-RS parameter to be activated and the closed-loop power control index includes at least one of the following: the index of the PL-RS parameter to be activated is associated with the closed-loop power control index; the index of the PL-RS parameter to be activated and the closed-loop power control index are associated with the same beam state respectively; and the index of the PL-RS parameter to be activated and the closed-loop power control index are configured in the same association relationship structure. The association relationship between the beam state parameter to be activated and the closed-loop power control index includes at least one of the following: the index of the beam state parameter to be activated is associated with the closed-loop power control index; and the index of the beam state parameter to be activated and the closed-loop power control index are configured in the same association relationship structure.

In the embodiment of the present disclosure, for Physical Uplink Shared Channel (PUSCH) transmission, the beam state includes at least one of the following: SRI, or SRI-PUSCH-PowerControl index, and TCI state.

In the embodiment of the present disclosure, for the PUSCH transmission, the association relationship structure includes: the association relationship between the SRI-PUSCH-PowerControl index or the TCI state and a power control parameter.

In the embodiment of the present disclosure, the closed-loop power control index is determined by SRI-PUSCH-ClosedLoopIndex which corresponds to the SRI corresponding to the PL-RS parameter to be activated in the high-level parameter SRI-PUSCH-PowerControl.

In the embodiment of the present disclosure, for Physical Uplink Control Channel (PUCCH) transmission, the beam state includes at least one of the following: a spatial-relation of PUCCH, a spatial-relation index of PUCCH, and a TCI state.

In the embodiment of the present disclosure, for the PUCCH transmission, the association relationship structure includes: the association relationship between the spatial-relation of PUCCH or the TCI state and the power control parameter.

In the embodiment of the present disclosure, the closed-loop power control index is determined by the closed-loop power control index corresponding to the spatial-relation of PUCCH corresponding to the PL-RS parameter to be activated.

In the embodiment of the present disclosure, the PL corresponding to the updated PL-RS parameter information takes effect after the first time if at least one of the following conditions is met: the total number of the PL-RSs configured is more than X, where X is a positive integer; and the PL-RS parameter to be activated is not the activated PL-RS.

In the embodiment of the present disclosure, the beam state corresponding to the updated beam state information takes effect after the second time.

In the embodiment of the present disclosure, the first time is determined by at least one of the following: an ACK response returned by the MAC CE which has received the updated PL-RS parameter information; the PL-RS to be activated is sent or received at least K times, where K is an integer greater than or equal to 1; after waiting for time T. The time T refers to one or more predetermined time units, and the predetermined time units include at least one of the following: radio frame, sub-frame, time slot, symbol, second, millisecond and microsecond.

According to another embodiment of the present disclosure, a parameter information receiving method is also provided, which may include that: updated PL-RS parameter information is received. The updated PL-RS parameter information includes at least one of the following information: a first PL-RS parameter and a second PL-RS parameter. For predetermined uplink transmissions, the first PL-RS parameter is replaced by the second PL-RS parameter.

In the embodiment of the present disclosure, the updated PL-RS parameter information is carried through one of the following signaling: the RRC signaling, the MAC CE signaling, and the physical layer signaling.

In the embodiment of the present disclosure, the uplink transmissions include at least one of the following: PUSCH transmission, PUCCH transmission, and SRS transmission.

In the embodiment of the present disclosure, the uplink transmission corresponding to the updated PL-RS parameter information is determined in a predetermined or configured mode.

In the embodiment of the present disclosure, the predetermined uplink transmissions determined in the predetermined or configured mode include at least one of the following: the PUSCH transmission, the PUCCH transmission, and the SRS transmission.

In the embodiment of the present disclosure, if the uplink transmission corresponding to the updated PL-RS parameter information is determined in the configured mode, the configured mode is carried through one of the following signaling: the RRC signaling, the MAC CE signaling, and the physical layer signaling.

In the embodiment of the present disclosure, some or all of association relationships of the uplink transmission corresponding to the updated PL-RS parameter information are determined in the predetermined or configured mode.

In the embodiment of the present disclosure, some or all of association relationships of the uplink transmission on which the updated PL-RS parameter information acts are indicated by one of the following ways: bitmap; N0 association relationships with the minimum index; and N1 association relationships with the maximum index. N0 and N1 are integers greater than or equal to 1.

In the embodiment of the present disclosure, cells or Bandwidth Parts (BWP) to which the uplink transmission corresponding to the updated PL-RS parameter information belongs are determined in the predetermined or configured mode.

In the embodiment of the present disclosure, the cells to which the uplink transmission corresponding to the updated PL-RS parameter information belongs include at least one of the following: cells related to transmission resources of the updated PL-RS parameter information, specific cells, configured cells, or all activated cells.

In the embodiment of the present disclosure, the BWPs to which the uplink transmission corresponding to the updated PL-RS parameter information belongs include: BWPs related to the transmission resources of the updated PL-RS information and activated BWPs.

According to another embodiment of the present disclosure, a parameter processing method is also provided, which may include that: after a second PL-RS parameter in the updated PL-RS parameter information takes effect, a first PL-RS parameter associated with uplink transmission is replaced by the second PL-RS parameter.

In the embodiment of the present disclosure, after the second PL-RS parameter takes effect, the method may further include that: a PL value of the uplink transmission is determined according to the PL value of the first PL-RS parameter associated with the uplink transmission; or the PL value of the uplink transmission is determined according to an L1-PL value of the second PL-RS parameter; or the PL value of the uplink transmission is determined according to the PL value of the first PL-RS parameter associated with the uplink transmission and the L1-PL value of the second PL-RS parameter.

In the embodiment of the present disclosure, after the second PL-RS parameter takes effect, the method may further include that: the PL value of the uplink transmission is determined according to the L1-PL value of the first PL-RS parameter associated with the uplink transmission and the L1-PL value of the second PL-RS parameter.

In the embodiment of the present disclosure, the method may also include that: the PL value of the first PL-RS parameter associated with the uplink transmission includes: the PL value of the first PL-RS parameter associated with the uplink transmission at or before the second PL-RS parameter in the updated PL-RS parameter information takes effect; the L1-PL value of the first PL-RS parameter associated with the uplink transmission includes: at least one L1-PL value of at least one RS sample of the first PL-RS parameter associated with the uplink transmission at or before the second PL-RS parameter in the updated PL-RS parameter information takes effect.

In the embodiment of the present disclosure, the PL value of the first PL-RS parameter associated with the uplink transmission at or before the second PL-RS parameter in the updated PL-RS parameter information takes effect is a fixed value.

In the embodiment of the present disclosure, the PL value of the uplink transmission is determined according to one or more L1-PL values filtered at high layer of the first PL-RS parameter associated with the uplink transmission before the second PL-RS parameter in the updated PL-RS parameter information takes effect and one or more L1-PL values filtered at high layer of the second PL-RS parameter at or after the second PL-RS parameter in the updated PL-RS parameter information takes effect.

In the embodiment of the present disclosure, the second PL-RS parameter in the updated PL-RS parameter information takes effect after the second time; or after the PL value of the second PL-RS parameter in the updated PL-RS parameter information takes effect, the PL value of the uplink transmission is determined according to the PL value of the second PL-RS parameter; or the PL value of the second PL-RS parameter in the updated PL-RS parameter information takes effect after the first time.

According to another embodiment of the present disclosure, a parameter resetting device is also provided, which may include: a resetting module, configured to reset relevant parameters of closed-loop power control after the PL corresponding to the updated PL-RS parameter information takes effect, or after the beam state information corresponding to the updated beam state information takes effect.

According to another embodiment of the present disclosure, a parameter resetting device is also provided, which may include: a processing module, configured to replace the first PL-RS parameter associated with the uplink transmission by the second PL-RS parameter after the second PL-RS parameter in the updated PL-RS parameter information takes effect.

According to another embodiment of the present disclosure, a parameter information receiving device is also provided, which may include: a receiving module, configured to receive the updated PL-RS parameter information. The updated PL-RS parameter information includes at least one of the following information: the first PL-RS parameter and the second PL-RS parameter. For the predetermined uplink transmissions, the first PL-RS parameter is replaced by the second PL-RS parameter.

According to an aspect of the embodiments of the present disclosure, a computer-readable storage medium is also provided, in which a computer program is stored. The computer program is configured to execute, when running, the parameter resetting method, or the parameter information receiving method, or the parameter processing method.

According to another aspect of the embodiments of the present disclosure, an electronic device is also provided, which may include: a memory, a processor and a computer program stored in the memory and capable of running in the processor. The processor executes through the computer program the parameter resetting method, or the parameter information receiving method, or the parameter processing method.

In the embodiments of the present disclosure, after the PL corresponding to the updated PL-RS parameter information takes effect, or after the beam state corresponding to the updated beam state information takes effect, the relevant parameters of closed-loop power control are reset. The described technical solution solves the problems in the related art, such as a problem that in a process where a new beam takes effect and the PL of an old beam is still used, the closed-loop power control is likely to accumulate a large negative value, causing the transmission power to drop suddenly after the PL of the new beam takes effect, and then the relevant parameters of closed-loop power control can be reset in the process where the new beam takes effect and the PL of the old beam is still used, avoiding the problem that the closed-loop power control accumulates to a large negative value.

BRIEF DESCRIPTION OF THE DRAWINGS

FIG. 1 is a flowchart of a parameter resetting method according to an embodiment of the present disclosure.

FIG. 2 is a structural schematic diagram of a parameter resetting device according to an embodiment of the present disclosure.

FIG. 3 is a flowchart of a parameter information receiving method according to an embodiment of the present disclosure.

FIG. 4 is a structural schematic diagram of a parameter information receiving device according to an embodiment of the present disclosure.

FIG. 5 is a flowchart of a parameter processing method according to an embodiment of the present disclosure.

FIG. 6 is a structural schematic diagram of a parameter processing device according to an embodiment of the present disclosure.

DETAILED DESCRIPTION OF THE EMBODIMENTS

Figure 7:
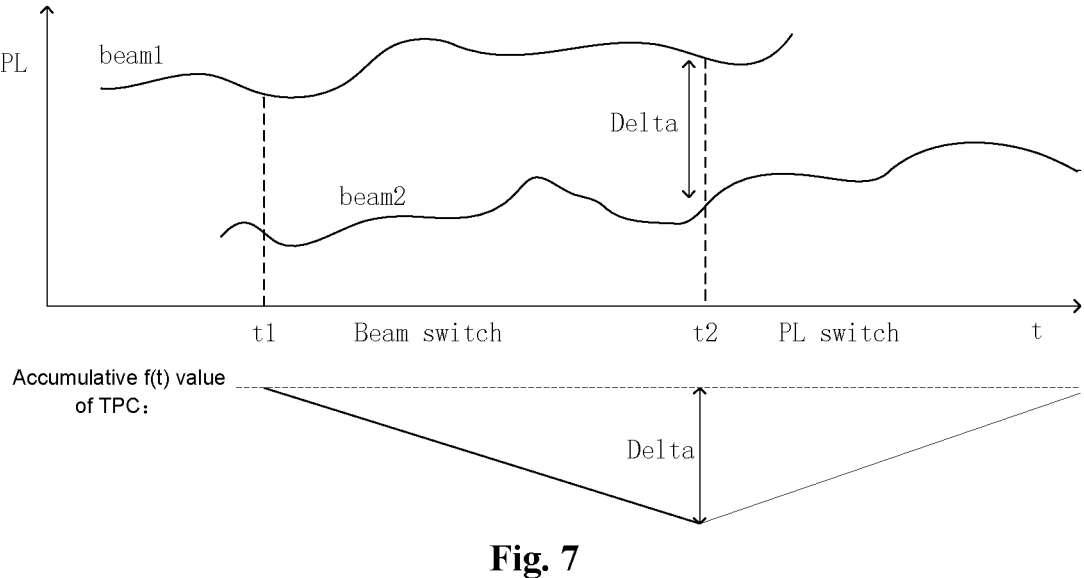
FIG. 7 is a schematic diagram of a PL according to an optional embodiment of the present disclosure.

In order to make those skilled in the art understand the solutions of the present disclosure better, the technical solutions in the embodiments of the present disclosure are clearly and completely elaborated below in combination with the accompanying drawings. It is apparent that the described embodiments are only a part of the embodiments of the present disclosure but not all. All other embodiments obtained by those of ordinary skill in the art based on the embodiments in the present disclosure without creative work shall fall within the scope of protection of the present disclosure.

It is to be noted that the terms like "first" and "second" in the specification, claims and accompanying drawings of the present disclosure are used for differentiating the similar objects, but do not have to describe a specific order or a sequence. It should be understood that the objects may be exchanged under appropriate circumstances, so that the embodiments of the present disclosure described here may be implemented in an order different from that described or shown here. In addition, terms "include" and "have" and any variations thereof are intended to cover non-exclusive inclusions. For example, it is not limited for processes, methods, systems, products or devices containing a series of steps or units to clearly list those steps or units, and other steps or units which are not clearly listed or are inherent to these processes, methods, products or devices may be included instead.

In an embodiment, a parameter resetting method is provided. FIG. 1 is a flowchart of a parameter resetting method according to an embodiment of the present disclosure. As shown in FIG. 1, the flow of the parameter resetting method may include the following steps.

At S102, after a PL corresponding to updated PL-RS parameter information takes effect, or after a beam state corresponding to updated beam state information takes effect, relevant parameters of closed-loop power control are reset.

It is to be noted that the PL-RS in the embodiment of the present disclosure refers to the RS as reference to measure the PL, also known as Pathloss Reference RS.

The update beam state information is also known as indication or update information of spatial-relationship, or indication or update information of TCI state.

In the embodiments of the present disclosure, after the PL corresponding to the updated PL-RS parameter information takes effect, or after the beam state corresponding to the updated beam state information takes effect, the relevant parameters of closed-loop power control are reset. The described technical solution solves the problems in the related art, such as a problem that in a process where a new beam takes effect and the PL of an old beam is still used, the closed-loop power control is likely to accumulate a large negative value, causing the transmission power to drop suddenly after the PL of the new beam takes effect, and then the relevant parameters of closed-loop power control can be reset in the process where the new beam takes effect and the PL of the old beam is still used, avoiding the problem that the closed-loop power control accumulates to a large negative value.

In the embodiment of the present disclosure, the updated PL-RS parameter information or the updated beam state information is carried through one of the following signaling: RRC) signaling, MAC CE signaling, and physical layer signaling.

In another embodiment of the present disclosure, that the MAC CE carries the updated PL-RS parameter information refers to that the Pathloss Reference RS activates/deactivates the MAC CE, including: the Pathloss Reference RS of PUSCH activates/deactivates the MAC CE, the Pathloss Reference RS of SRS activates/deactivates the MAC CE, or the Pathloss Reference RS of PUCCH activates/deactivates the MAC CE.

In the embodiment of the present disclosure, the relevant parameters of closed-loop power control include a power control adjustment state corresponding to a closed-loop power control index.

In the embodiment of the present disclosure, that the closed-loop power control index is determined according to a PL-RS parameter to be activated in the updated PL-RS parameter information or a beam state parameter to be activated in the updated beam state information may include that: the closed-loop power control index is determined according to the index of the PL-RS parameter to be activated; or the closed-loop power control index is determined according to an association relationship between the PL-RS parameter to be activated and the closed-loop power control index; or the closed-loop power control index is determined according to the beam state parameter to be activated; or the closed-loop power control index is determined according to an association relationship between the beam state parameter to be activated and the closed-loop power control index.

In the embodiment of the present disclosure, the association relationship between the PL-RS parameter to be activated and the closed-loop power control index includes at least one of the following: the index of the PL-RS parameter to be activated is associated with the closed-loop power control index; the index of the PL-RS parameter to be activated and the closed-loop power control index are associated with the same beam state respectively; and the index of the PL-RS parameter to be activated and the closed-loop power control index are configured in the same association relationship structure. The association relationship between the beam state parameter to be activated and the closed-loop power control index includes at least one of the following: the index of the beam state parameter to be activated is associated with the closed-loop power control index; and the index of the beam state parameter to be activated and the closed-loop power control index are configured in the same association relationship structure.

In the embodiment of the present disclosure, for PUSCH transmission, the beam state includes at least one of the following: SRI, or SRI-PUSCH-PowerControl index, and TCI state.

In the embodiment of the present disclosure, for the PUSCH transmission, the association relationship structure includes: the association relationship between the SRI-PUSCH-PowerControl index or the TCI state and a power control parameter.

In the embodiment of the present disclosure, the closed-loop power control index is determined by SRI-PUSCH-ClosedLoopIndex which corresponds to the SRI corresponding to the PL-RS parameter to be activated in the high-level parameter SRI-PUSCH-PowerControl.

In the embodiment of the present disclosure, for PUCCH transmission, the beam state includes at least one of the following: a spatial-relation of PUCCH, a spatial-relation index of PUCCH, and a TCI state.

In the embodiment of the present disclosure, for the PUCCH transmission, the association relationship structure includes: the association relationship between the spatial-relation of PUCCH or the TCI state and the power control parameter.

In the embodiment of the present disclosure, the closed-loop power control index is determined by the closed-loop power control index corresponding to the spatial-relation of PUCCH corresponding to the PL-RS parameter to be activated.

In the embodiment of the present disclosure, the PL corresponding to the updated PL-RS parameter information takes effect after the first time if at least one of the following conditions is met: the total number of the PL-RSs configured is more than X, where X is a positive integer, for example, 4; and the PL-RS parameter to be activated is not the activated PL-RS.

In the embodiment of the present disclosure, the beam state corresponding to the updated beam state information takes effect after the second time.

In the embodiment of the present disclosure, the first time is determined by at least one of the following: an ACK response to the updated PL-RS parameter information; the PL-RS to be activated is sent or received at least K times, where K is an integer greater than or equal to 1; after waiting for time T. The time T refers to one or more predetermined time units, and the predetermined time units include at least one of the following: radio frame, sub-frame, time slot, symbol, second, millisecond and microsecond.

Through the above description of implementation modes, those skilled in the art may clearly know that the method according to the above embodiments may be implemented by means of software plus a necessary common hardware platform, certainly by means of hardware; but in many cases, the former is the better implementation. Based on this understanding, the technical solution of the present disclosure substantially or the part making a contribution to the prior art can be embodied in the form of software product; the computer software product is stored in a storage medium (for example, a Read-Only Memory (ROM)/Random Access Memory (RAM), a magnetic disk, and a compact disc) and includes a number of instructions to make a terminal device (which can be a cell phone, a personal computer, a server or a network device, etc.) perform all or part of the method in each embodiment of the present disclosure.

In an embodiment, a parameter resetting device is also provided, which is configured to implement the above embodiments and preferred implementation modes. The embodiments and preferred implementations that have been elaborated will not be repeated here. The term "module" used below can realize a combination of software and/or hardware with an intended function. Although the device described in the following embodiment is preferably realized by software, but by hardware or a combination of software and hardware is also possible and conceived. FIG. 2 is a structural schematic diagram of a parameter resetting device according to an embodiment of the present disclosure. The device may include: a resetting module 20.

The resetting module 20 is configured to reset the relevant parameters of closed-loop power control after the PL corresponding to the updated PL-RS parameter information takes effect, or after the beam state corresponding to the updated beam state information takes effect.

It is to be noted that the PL-RS in the embodiment of the present disclosure refers to the RS as reference to measure the PL, also known as Pathloss Reference RS.

The update beam state information is also known as indication or update information of spatial-relationship, or indication or update information of TCI state.

In the embodiments of the present disclosure, after the PL corresponding to the updated PL-RS parameter information takes effect, or after the beam state corresponding to the updated beam state information takes effect, the relevant parameters of closed-loop power control are reset. The described technical solution solves the problems in the related art, such as the problem that in a process where a new beam takes effect and the PL of an old beam is still used, the closed-loop power control is likely to accumulate a large negative value, causing the transmission power to drop suddenly after the PL of the new beam takes effect, and then the relevant parameters of closed-loop power control can be reset in the process where the new beam takes effect and the PL of the old beam is still used, avoiding the problem that the closed-loop power control accumulates to a large negative value.

In the embodiment of the present disclosure, the updated PL-RS parameter information or the updated beam state information is carried through one of the following signaling: RRC signaling, MAC CE signaling, and physical layer signaling.

In another embodiment of the present disclosure, that the MAC CE carries the updated PL-RS parameter information refers to that the Pathloss Reference RS activates/deactivates the MAC CE, including: the Pathloss Reference RS of PUSCH activates/deactivates the MAC CE, the Pathloss Reference RS of SRS activates/deactivates the MAC CE, or the Pathloss Reference RS of PUCCH activates/deactivates the MAC CE.

In the embodiment of the present disclosure, the relevant parameters of closed-loop power control include a power control adjustment state corresponding to a closed-loop power control index.

In the embodiment of the present disclosure, that the closed-loop power control index is determined according to a PL-RS parameter to be activated in the updated PL-RS parameter information or a beam state parameter to be activated in the updated beam state information may include that: the closed-loop power control index is determined according to the index of the PL-RS parameter to be activated; or the closed-loop power control index is determined according to an association relationship between the PL-RS parameter to be activated and the closed-loop power control index; or the closed-loop power control index is determined according to the beam state parameter to be activated; or the closed-loop power control index is determined according to an association relationship between the beam state parameter to be activated and the closed-loop power control index.

In the embodiment of the present disclosure, the association relationship between the PL-RS parameter to be activated and the closed-loop power control index includes at least one of the following: the index of the PL-RS parameter to be activated is associated with the closed-loop power control index; the index of the PL-RS parameter to be activated and the closed-loop power control index are associated with the same beam state respectively; and the index of the PL-RS parameter to be activated and the closed-loop power control index are configured in the same association relationship structure. The association relationship between the beam state parameter to be activated and the closed-loop power control index includes at least one of the following: the index of the beam state parameter to be activated is associated with the closed-loop power control index; and the index of the beam state parameter to be activated and the closed-loop power control index are configured in the same association relationship structure.

In the embodiment of the present disclosure, for the PUSCH transmission, the beam state includes at least one of the following: the SRI, or the SRI-PUSCH-PowerControl index, and the TCI state.

In the embodiment of the present disclosure, for the PUSCH transmission, the association relationship structure includes: the association relationship between the SRI-PUSCH-PowerControl index or the TCI state and the power control parameter.

In the embodiment of the present disclosure, the closed-loop power control index is determined by SRI-PUSCH-ClosedLoopIndex which corresponds to the SRI corresponding to the PL-RS parameter to be activated in the high-level parameter SRI-PUSCH-PowerControl.

In the embodiment of the present disclosure, for the PUCCH transmission, the beam state includes at least one of the following: the spatial-relation of PUCCH, the spatial-relation index of PUCCH, and the TCI state.

In the embodiment of the present disclosure, for the PUCCH transmission, the association relationship structure includes: the association relationship between the spatial-relation of PUCCH or the TCI state and the power control parameter.

In the embodiment of the present disclosure, the closed-loop power control index is determined by the closed-loop power control index corresponding to the spatial-relation of PUCCH corresponding to the PL-RS parameter to be activated.

In the embodiment of the present disclosure, the PL corresponding to the updated PL-RS parameter information takes effect after the first time if at least one of the following conditions is met: the total number of the PL-RSs configured is more than X, where X is a positive integer, for example, 4; and the PL-RS parameter to be activated is not the activated PL-RS.

In the embodiment of the present disclosure, the first time is determined by at least one of the following: an ACK response to the updated PL-RS parameter information; the PL-RS to be activated is sent or received at least K times, where K is an integer greater than or equal to 1; after waiting for time T. The time T refers to one or more predetermined time units, and the predetermined time units include at least one of the following: radio frame, sub-frame, time slot, symbol, second, millisecond and microsecond.

To solve the problem in the related art that the MAC CE updates the PL-RS separately for the PUSCH, the PUCCH and the SRS, and there is no update of cell grouping, resulting in too much overhead for updating the PL-RS, the embodiments of the present disclosure also provide the following technical solution.

In an embodiment, a parameter information receiving method is provided. FIG. 3 is a flowchart of a parameter information receiving method according to an embodiment of the present disclosure. As shown in FIG. 3, the flow of the parameter information receiving method may include the following steps.

At S302, updated PL-RS parameter information is received, the updated PL-RS parameter information including at least one of the following information: a first PL-RS parameter and a second PL-RS parameter; and for predetermined uplink transmissions, the first PL-RS parameter is replaced by the second PL-RS parameter.

Through the above technical solution, the updated PL-RS parameter information is received, the updated PL-RS parameter information including at least one of the following information: a first PL-RS parameter and a second PL-RS parameter, and for the predetermined uplink trans- missions, the first PL-RS parameter is replaced by the second PL-RS parameter, thereby avoiding the problem of too much overhead for updating the PL-RS.

In the embodiment of the present disclosure, the updated PL-RS parameter information is carried through one of the following signaling: the RRC signaling, the MAC CE sig- naling, and the physical layer signaling.

In the embodiment of the present disclosure, the uplink transmissions include at least one of the following: the PUSCH transmission, the PUCCH transmission, and the SRS transmission.

In the embodiment of the present disclosure, the uplink transmission corresponding to the updated PL-RS parameter information is determined in a predetermined or configured mode.

In the embodiment of the present disclosure, the prede- termined uplink transmissions determined in the predeter- mined or configured mode include at least one of the following: the PUSCH transmission, the PUCCH transmis- sion, and the SRS transmission.

In the embodiment of the present disclosure, if the uplink transmission corresponding to the updated PL-RS parameter information is determined in the configured mode, the configured mode is carried through one of the following signaling: the RRC signaling, the MAC CE signaling, and the physical layer signaling.

In the embodiment of the present disclosure, some or all of association relationships of the uplink transmission cor- responding to the updated PL-RS parameter information are determined in the predetermined or configured mode.

In the embodiment of the present disclosure, some or all of association relationships of the uplink transmission on which the updated PL-RS parameter information acts are indicated by one of the following ways: bitmap; N0 asso- ciation relationships with the minimum index; and N1 association relationships with the maximum index. N0 and N1 are integers greater than or equal to 1.

In the embodiment of the present disclosure, cells or BWPs to which the uplink transmission corresponding to the updated PL-RS parameter information belongs are deter- mined in the predetermined or configured mode.

In the embodiment of the present disclosure, the cells to which the uplink transmission corresponding to the updated PL-RS parameter information belongs include at least one of the following: cells related to transmission resources of the updated PL-RS parameter information, specific cells, con- figured cells, or all activated cells.

In the embodiment of the present disclosure, the BWPs to which the uplink transmission corresponding to the updated PL-RS parameter information belongs include: BWPs related to the transmission resources of the updated PL-RS information and activated BWPs.

Through the above description of implementation modes, those skilled in the art may clearly know that the method according to the above embodiments may be implemented by means of software plus a necessary common hardware platform, certainly by means of hardware; but in many cases, the former is the better implementation. Based on this understanding, the technical solution of the present disclo- sure substantially or the part making a contribution to the prior art can be embodied in the form of software product; the computer software product is stored in a storage medium (for example, an ROM/RAM, a magnetic disk, and a com- pact disc) and includes a number of instructions to make a terminal device (which can be a cell phone, a personal computer, a server or a network device, etc.) perform all or part of the method in each embodiment of the present disclosure.

In an embodiment, a parameter information receiving device is also provided, which is configured to implement the above embodiments and preferred implementation modes. The embodiments and preferred implementations that have been elaborated will not be repeated here. The term "module" used below can realize a combination of software and/or hardware with an intended function. Although the device described in the following embodiment is preferably realized by software, but by hardware or a combination of software and hardware is also possible and conceived. FIG. 4 is a structural schematic diagram of a parameter informa- tion receiving device according to an embodiment of the present disclosure. The device may include: a receiving module 40.

The receiving module 40 is configured to: receive the updated PL-RS parameter information, the updated PL-RS parameter information including at least one of the follow- ing information: the first PL-RS parameter and the second PL-RS parameter; and for the predetermined uplink trans- missions, replace the first PL-RS parameter by the second PL-RS parameter.

Through the above technical solution, the updated PL-RS parameter information is received, the updated PL-RS parameter information including at least one of the follow- ing information: a first PL-RS parameter and a second PL-RS parameter, and for the predetermined uplink trans- missions, the first PL-RS parameter is replaced by the second PL-RS parameter, thereby avoiding the problem of too much overhead for updating the PL-RS.

In the embodiment of the present disclosure, the updated PL-RS parameter information is carried through one of the following signaling: the RRC signaling, the MAC CE sig- naling, and the physical layer signaling.

In the embodiment of the present disclosure, the uplink transmissions include at least one of the following: the PUSCH transmission, the PUCCH transmission, and the SRS transmission.

In the embodiment of the present disclosure, the uplink transmission corresponding to the updated PL-RS parameter information is determined in the predetermined or configured mode.

In the embodiment of the present disclosure, the predetermined uplink transmissions determined in the predetermined or configured mode include at least one of the following: the PUSCH transmission, the PUCCH transmission, and the SRS transmission.

In the embodiment of the present disclosure, if the uplink transmission corresponding to the updated PL-RS parameter information is determined in the configured mode, the configured mode is carried through one of the following signaling: the RRC signaling, the MAC CE signaling, and the physical layer signaling.

In the embodiment of the present disclosure, some or all of association relationships of the uplink transmission corresponding to the updated PL-RS parameter information are determined in the predetermined or configured mode.

In the embodiment of the present disclosure, some or all of association relationships of the uplink transmission on which the updated PL-RS parameter information acts are indicated by one of the following ways: bitmap; N0 association relationships with the minimum index; and N1 association relationships with the maximum index. N0 and N1 are integers greater than or equal to 1.

In the embodiment of the present disclosure, the cells or BWPs to which the uplink transmission corresponding to the updated PL-RS parameter information belongs are determined in the predetermined or configured mode.

In the embodiment of the present disclosure, the cells to which the uplink transmission corresponding to the updated PL-RS parameter information belongs include at least one of the following: the cell related to transmission resources of the updated PL-RS parameter information, the specific cell, the configured cell, or all activated cells.

In the embodiment of the present disclosure, the BWPs to which the uplink transmission corresponding to the updated PL-RS parameter information belongs include: the BWP related to the transmission resources of the updated PL-RS information and the activated BWP.

In an embodiment, a parameter processing method is provided. FIG. 5 is a flowchart of a parameter processing method according to an embodiment of the present disclosure. As shown in FIG. 5, the flow of the parameter processing method may include the following steps.

At S502, after a second PL-RS parameter in updated PL-RS parameter information takes effect, a first PL-RS parameter associated with uplink transmission is replaced by the second PL-RS parameter.

In the embodiments of the present disclosure, after the second PL-RS parameter in the updated PL-RS parameter information takes effect, the first PL-RS parameter associated with the uplink transmission is replaced by the second PL-RS parameter. The described technical solution solves the problems in the related art, such as the problem that in a process where a new beam takes effect and the PL of an old beam is still used, the closed-loop power control is likely to accumulate a large negative value, causing the transmission power to drop suddenly after the PL of the new beam takes effect, and then the relevant parameters of closed-loop power control can be reset in the process where the new beam takes effect and the PL of the old beam is still used, avoiding the problem that the closed-loop power control accumulates to a large negative value.

The technical solution of the embodiments of the present disclosure may be understood as a new second PL-RS takes effect at time t1 in FIG. 7, but its PL of high-level filtering has not yet taken effect; and the PL corresponding to the new PL-RS takes effect at time t2.

It is to be noted that TPC in FIG. 7 is short for Transmit Power Control.

That is, the first PL-RS parameter is the old PL-RS parameter associated with the uplink transmission. When the updated PL-RS parameter information is received, and the second PL-RS parameter (the new PL-RS parameter) in the updated PL-RS parameter information takes effect, the PL-RS parameter associated with the uplink transmission is replaced by the second PL-RS parameter in the updated PL-RS parameter information.

In the embodiment of the present disclosure, after the second PL-RS parameter takes effect, the method may further include that: a PL value of the uplink transmission is determined according to the PL value of the first PL-RS parameter associated with the uplink transmission; or the PL value of the uplink transmission is determined according to an L1-PL value of the second PL-RS parameter; or the PL value of the uplink transmission is determined according to the PL value of the first PL-RS parameter associated with the uplink transmission and the L1-PL value of the second PL-RS parameter.

In the embodiment of the present disclosure, after the second PL-RS parameter takes effect, the method may further include that: the PL value of the uplink transmission is determined according to the L1-PL value of the first PL-RS parameter associated with the uplink transmission and the L1-PL value of the second PL-RS parameter.

In the embodiment of the present disclosure, the method may also include that: the PL value of the first PL-RS parameter associated with the uplink transmission includes: the PL value of the first PL-RS parameter associated with the uplink transmission at or before the second PL-RS parameter in the updated PL-RS parameter information takes effect; the L1-PL value of the first PL-RS parameter associated with the uplink transmission includes: at least one L1-PL value of at least one RS sample of the first PL-RS parameter associated with the uplink transmission at or before the second PL-RS parameter in the updated PL-RS parameter information takes effect.

In the embodiment of the present disclosure, the PL value of the first PL-RS parameter associated with the uplink transmission at or before the second PL-RS parameter in the updated PL-RS parameter information takes effect is a fixed value.

In the embodiment of the present disclosure, the PL value of the uplink transmission is determined according to one or more L1-PL values filtered at high layer of the first PL-RS parameter associated with the uplink transmission before the second PL-RS parameter in the updated PL-RS parameter information takes effect and one or more L1-PL values filtered at high layer of the second PL-RS parameter at or after the second PL-RS parameter in the updated PL-RS parameter information takes effect.

It is to be noted that the L1-PL refers to the path loss value of Layer 1 (L1), also refers to the path loss value of the physical layer. The value is determined by a difference value between the transmission power of the reference signal (PL-RS) for measuring the PL and the Reference Signal Receiving Power (RSRP) of the PL-RS of L1.

The PL value is the path loss value, generally L3-PL, that is, the path loss value of Layer 3 (L3), or the path loss value of high-level filtering. The value is determined by a difference value between the transmission power of the reference signal (PL-RS) for measuring the PL and the RSRP of high-level filtering.

In the embodiment of the present disclosure, the second PL-RS parameter in the updated PL-RS parameter information takes effect after the second time; or the PL value of the second PL-RS parameter in the updated PL-RS parameter information takes effect after the first time; or after the PL value of the second PL-RS parameter in the updated PL-RS parameter information takes effect, the PL value of the uplink transmission is determined according to the PL value of the second PL-RS parameter.

In the embodiment of the present disclosure, the first time is determined by at least one of the following: the ACK response to the updated PL-RS parameter information; the PL-RS to be activated is sent or received at least K times, where K is an integer greater than or equal to 1; after waiting for time T. The time T refers to one or more predetermined time units, and the predetermined time units include at least one of the following: radio frame, sub-frame, time slot, symbol, second, millisecond and microsecond.

It is to be noted that in FIG. 7, the time t1 is determined by the second time, and the time t2 is determined by the first time.

Through the above description of implementation modes, those skilled in the art may clearly know that the method according to the above embodiments may be implemented by means of software plus a necessary common hardware platform, certainly by means of hardware; but in many cases, the former is the better implementation. Based on this understanding, the technical solution of the present disclosure substantially or the part making a contribution to the prior art can be embodied in the form of software product; the computer software product is stored in a storage medium (for example, an ROM)/RAM, a magnetic disk, and a compact disc) and includes a number of instructions to make a terminal device (which can be a cell phone, a personal computer, a server or a network device, etc.) perform the method in each embodiment of the present disclosure.

In an embodiment, a parameter processing device is also provided, which is configured to implement the above embodiments and preferred implementation modes. The embodiments and preferred implementations that have been elaborated will not be repeated here. The term "module" used below can realize a combination of software and/or hardware with an intended function. Although the device described in the following embodiment is preferably realized by software, but by hardware or a combination of software and hardware is also possible and conceived. FIG. 6 is a structural schematic diagram of a parameter processing device according to an embodiment of the present disclosure. The device may include: a processing module 60.

The processing module 60 is configured to replace the first PL-RS parameter associated with the uplink transmission by the second PL-RS parameter after the second PL-RS parameter in updated PL-RS parameter information takes effect.

In the embodiments of the present disclosure, after the second PL-RS parameter in updated PL-RS parameter information takes effect, the first PL-RS parameter associated with the uplink transmission is replaced by the second PL-RS parameter. The described technical solution solves the problems in the related art, such as the problem that in a process where a new beam takes effect and the PL of an old beam is still used, the closed-loop power control is likely to accumulate a large negative value, causing the transmission power to drop suddenly after the PL of the new beam takes effect, and then the relevant parameters of closed-loop power control can be reset in the process where the new beam takes effect and the PL of the old beam is still used, avoiding the problem that the closed-loop power control accumulates to a large negative value.

That is, the first PL-RS parameter is the old PL-RS parameter associated with the uplink transmission. When the updated PL-RS parameter information is received, and the second PL-RS parameter (the new PL-RS parameter) in the updated PL-RS parameter information takes effect, the PL-RS parameter associated with the uplink transmission is replaced by the second PL-RS parameter in the updated PL-RS parameter information.

In the embodiment of the present disclosure, after the second PL-RS parameter takes effect, the method may further include that: the PL value of the uplink transmission is determined according to the PL value of the first PL-RS parameter associated with the uplink transmission; or the PL value of the uplink transmission is determined according to the L1-PL value of the second PL-RS parameter; or the PL value of the uplink transmission is determined according to the PL value of the first PL-RS parameter associated with the uplink transmission and the L1-PL value of the second PL-RS parameter.

In the embodiment of the present disclosure, after the second PL-RS parameter takes effect, the method may further include that: the PL value of the uplink transmission is determined according to the L1-PL value of the first PL-RS parameter associated with the uplink transmission and the L1-PL value of the second PL-RS parameter.

In the embodiment of the present disclosure, the method may also include that: the PL value of the first PL-RS parameter associated with the uplink transmission includes: the PL value of the first PL-RS parameter associated with the uplink transmission at or before the second PL-RS parameter in the updated PL-RS parameter information takes effect; the L1-PL value of the first PL-RS parameter associated with the uplink transmission includes: at least one L1-PL value of at least one RS sample of the first PL-RS parameter associated with the uplink transmission at or before the second PL-RS parameter in the updated PL-RS parameter information takes effect.

In the embodiment of the present disclosure, the PL value of the first PL-RS parameter associated with the uplink transmission at or before the second PL-RS parameter in the updated PL-RS parameter information takes effect is a fixed value.

In the embodiment of the present disclosure, the PL value of the uplink transmission is determined according to one or more L1-PL values filtered at high layer of the first PL-RS parameter associated with the uplink transmission before the second PL-RS parameter in the updated PL-RS parameter information takes effect and one or more L1-PL values filtered at high layer of the second PL-RS parameter at or after the second PL-RS parameter in the updated PL-RS parameter information takes effect.

It is to be noted that the L1-PL refers to the path loss value of L1, also refers to the path loss value of the physical layer. The value is determined by the difference value between the transmission power of the reference signal (PL-RS) for measuring the PL and the RSRP of the PL-RS of L1.

The PL value is the path loss value, generally the L3-PL, that is, the path loss value of L3, or the path loss value of high-level filtering. The value is determined by the difference value between the transmission power of the reference signal (PL-RS) for measuring the PL and the RSRP of high-level filtering.

In the embodiment of the present disclosure, the second PL-RS parameter in the updated PL-RS parameter information takes effect after the second time; or the PL value of the second PL-RS parameter in the updated PL-RS parameter information takes effect after the first time; or after the PL value of the second PL-RS parameter in the updated PL-RS parameter information takes effect, the PL value of the uplink transmission is determined according to the PL value of the second PL-RS parameter.

In order to better understand the parameter resetting process and the parameter information receiving process in the above embodiments, the above technical solutions are illustrated with examples below, but the examples are not used to limit the technical solutions of the embodiments of the present disclosure.

Example 1: Closed-Loop Power Control Reset

In the related art, when a communication beam between a base station and UE changes, the beam state may be updated through the MAC CE. For the uplink transmission, the path loss value for determining the transmission power is measured by a downlink RS. When the communication beam between the base station and the UE changes, path loss measurement parameters may also be updated through the MAC CE. The path loss is also called Pathloss (PL for short). The path loss measurement parameters include RS indication information for measuring the PL, and may also be abbreviated as PL-RS parameters.

The beam state includes at least one of the following: a Quasi Co-Location (QCL) state, a Transmission Configuration Indication (TCI) state, spatial-relation information, RS information (e.g., SRI and SRS resource indicator), spatial filter information, and pre-coding information.

When the communication beam between the base station and the UE changes, the MAC CE needs to update the beam state of subsequent transmission as well as the PL-RS parameters associated with subsequent uplink transmission.

Generally, after receiving MAC CE information, the UE feeds back ACK information to the base station, and the MAC CE information takes effect after a period of time TO after the uplink transmission including the ACK information is sent. TO may be 3 ms, or 3 slots, and 3 sub-frames, etc. However, the time when the MAC CE updating the PL takes effect has its particularity. The PL is a measurement result of the L3 (high layer), when it is updated to a PL-RS parameter that was not activated before, the measurement result of the PL-RS needs to be filtered multiple times to obtain a reliable PL value. Therefore, the time when the MAC CE updating the PL-RS takes effect is later than the time when a common MAC CE takes effect. The MAC CE updating the PL-RS takes effect after the time required to send K PL-RSs after the above MAC CE takes effect.

As shown in FIG. 7, it is assumed that at time t1, the MAC CE updating the beam state takes effect, and at time t2, the MAC CE updating the PL-RS takes effect. After the time t1, the transmission uses a new beam state to determine sending modes, such as sending beams, pre-coded parameters, etc. After the time t2, the PL-RS corresponding to the new beam state can take effect. The old beam state is represented by beam1, and the new beam state is represented by beam2. The PL value of the new beam state beam2 is smaller than that of the old beam state beam1. Between the time t1 and the time t2, the transmission uses the new beam state beam2, and the PL value matching it should be used, but the PL value of beam2 is not stable yet and does not take effect, so only the PL value of beam1 is used. In this case, the PL of the actual transmission link is small, and the PL value used by the UE to determine the transmission power of the uplink transmission is large (larger than the actual value). Therefore, it can be predicted that from the time t1 to the time t2, the base station will reduce the transmission power of the uplink transmission through a closed-loop power control TPC command. Assuming that at the time t2, the UE has fully compensated, or compensated to some extent, for the difference of PL between beam1 and beam2 through an accumulative effect of several TPC commands of negative values, when the PL value of beam2 takes effect at the time t2, a closed-loop power control part (namely power control adjustment state) of the UE is expected to be a large negative value. The PL value of beam2 which should start at the time t2 matches beam2 as the beam actually sent, but the closed-loop power control part of the UE at this time reflects the accumulation of historical TPC commands, and is expected to have a large negative value, which will have a bad impact on the power after the PL is switched at the time t2. The transmission power calculated by the UE is highly likely to be lower than the demanded power of the actual link.

In an optional embodiment of the present disclosure, after the PL corresponding to the updated PL-RS parameter information takes effect, the relevant parameters of closed-loop power control are reset.

Further, the updated PL-RS parameter information is carried through one of the following signaling: the RRC signaling, the MAC CE signaling, and the physical layer signaling.

That the MAC CE carries the updated PL-RS parameter information is taken as an example.

That the PL corresponding to the MAC CE carrying the updated PL-RS parameter information takes effect includes that:

the PL corresponding to the new PL-RS takes effect after the first time if at least one of the following conditions is met: the total number of the PL-RSs configured is more than X, where X is a positive integer, for example, 4; and the new PL-RS is not the activated PL-RS.

The first time is determined by at least one of the following ways: returning the ACK response after the MAC CE updating the PL-RS is received; waiting the new PL-RS to be sent K times, where K is an integer greater than or equal to 1, for example, 5; and after waiting for time T. The time T refers to one or more predetermined time units, and the predetermined time units include at least one of the following: radio frame, sub-frame, time slot, symbol (namely OFDM symbol) second, millisecond and microsecond. For example, the time T is 2 ms, or 3 sub-frames.

Figure 8:
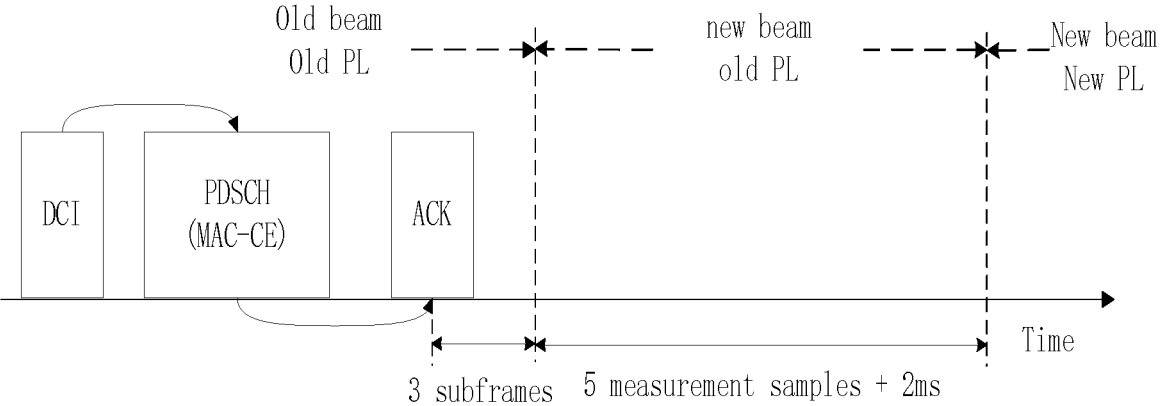
FIG. 8 is a schematic diagram that UE makes a response after receiving an MAC CE carrying updated PL-RS parameter and updated beam state according to an optional embodiment of the present disclosure.

An example is given below for a determining manner of the first time. As shown in FIG. 8, the UE returns an HARQ-ACK response after receiving the MAC CE carrying the updated PL-RS parameter and the updated beam state, after 3 sub-frames, the updated beam state takes effect, that is, the new beam takes effect; however, after a period of time, for example, the RS corresponding to five updated PL-RS parameters is sent for at least five times, and waiting for the time T, for example, 2 ms, the PL corresponding to the updated PL-RS parameter takes effect.

Further, the relevant parameters of closed-loop power control include: the power control adjustment state which corresponds to the closed-loop power control index corresponding to the new PL-RS parameter.

Further, that the closed-loop power control index is determined according to the new PL-RS parameter includes that: the closed-loop power control index is determined according to the index of the new PL-RS parameter; or the closed-loop power control index is determined according to the association relationship between the new PL-RS parameter and the closed-loop power control index.

The association relationship between the PL-RS parameter and the closed-loop power control index includes one of the following: the PL-RS parameter index is associated with the closed-loop power control index; the PL-RS parameter index and the closed-loop power control index are associated with the same beam state respectively; and the PL-RS parameter index and the closed-loop power control index are configured in the same association relationship structure.

For the PUSCH transmission, the beam state includes: the SRI, or the SRI-PUSCH-PowerControl index, and the TCI state.

For the PUSCH transmission, the association relationship structure includes: the association relationship between the SRI-PUSCH-PowerControl index or the TCI state and the power control parameter.

Specifically, a closed-loop ID is determined by SRI-PUSCH-ClosedLoopIndex which corresponds to the SRI corresponding to the updated PL-RS in the high-level parameter SRI-PUSCH-PowerControl.

The SRI corresponding to the updated PL-RS refers to the SRI included in the MAC CE updating the PL-RS.

In another optional embodiment of the present disclosure, after the beam state corresponding to the updated beam state information takes effect, the relevant parameters of closed-loop power control are reset.

Further, the updated beam state information is carried through one of the following signaling: the RRC signaling, the MAC CE signaling, and the physical layer signaling.

That the MAC CE carries the updated beam state information is taken as an example.

That the beam state corresponding to the MAC CE carrying the updated beam state information takes effect includes that:

the updated beam state takes effect after the second time if at least one of the following conditions is met:

the second time is determined by at least one of the following ways: returning the ACK response after the MAC CE updating the beam state is received; and waiting for time T. The time T refers to one or more predetermined time units, and the predetermined time units include at least one of the following: radio frame, sub-frame, time slot, symbol (namely OFDM symbol) second, millisecond and microsecond. For example, the time T is 2 ms, or 3 sub-frames.

An example is given below for a determining manner of the second time. As shown in FIG. 8, the UE returns the HARQ-ACK response after receiving the MAC CE carrying the updated beam state, after 3 sub-frames, the updated beam state takes effect.

Further, the relevant parameters of closed-loop power control include: the power control adjustment state which corresponds to the closed-loop power control index corresponding to the updated beam state.

Further, that the closed-loop power control index is determined according to the updated beam state includes that: the closed-loop power control index is determined according to the updated beam state index; or the closed-loop power control index is determined according to the association relationship between the updated beam state and the closed-loop power control index.

The association relationship between the beam state and the closed-loop power control index includes one of the following: the beam state index is associated with the closed-loop power control index; and the beam state index and the closed-loop power control index are configured in the same association relationship structure.

The association of the beam state of the uplink transmission with the spatial-relation is configured by the MAC CE, and/or the association of the beam state with the PL-RS is configured by the MAC CE, and the relevant parameters of closed-loop power control referring to the uplink transmission of the beam state are reset.

Further, the association of the beam state of the uplink transmission with the spatial-relation is configured by the MAC CE, and/or the association of the beam state with the PL-RS is configured by the MAC CE, and after the beam state corresponding to the updated beam state information takes effect, the relevant parameters of closed-loop power control referring to the uplink transmission of the beam state are reset.

Further, the association of the beam state of the uplink transmission with the spatial-relation is configured by the MAC CE, and/or the association of the beam state with the PL-RS is configured by the MAC CE, and after the PL which corresponds to the PL-RS corresponding to the updated beam state information takes effect, the relevant parameters of closed-loop power control referring to the uplink transmission of the beam state are reset.

For example, in FIG. 7, the new beam state takes effect at the time t1, while the PL corresponding to the new beam state has not taken effect yet, resulting in a mismatch between the beam state and the PL from the time t1 to the time t2. The method for solving the problem may also include that: a smooth transition PL value is used for the uplink transmission between the time t1 and the time t2 to prevent or mitigate the sudden performance degradation caused by the closed-loop power control accumulation (the power control adjustment state) due to switching the PL value at the time t2.

Before the time t1, the PL of the uplink transmission is determined according to the PL of the old PL-RS associated with the uplink transmission.

After the time t2, the PL of the uplink transmission is determined according to the PL of the new PL-RS associated with the uplink transmission.

Between the time t1 and the time t2, the PL of the uplink transmission is determined according to one of the following:

the PL of the old PL-RS associated with the uplink transmission;

the L1-PL of the new PL-RS associated with the uplink transmission;

the PL value filtered at high layer of at least one L1-PL of the new PL-RS associated with the uplink transmission;

the PL of the old PL-RS associated with the uplink transmission and the PL value filtered at high layer of at least one L1-PL of the new PL-RS associated with the uplink transmission; and the PL values filtered at high layer of at least one L1-PL of the old PL-RS associated with the uplink transmission and at least one L1-PL of the new PL-RS associated with the uplink transmission.

The PL of the old PL-RS associated with the uplink transmission is the PL value of the old PL-RS associated with the uplink transmission at or before the time t1.

The at least one L1-PL of the old PL-RS associated with the uplink transmission is the L1-PL value corresponding to at least one RS sample of the old PL-RS associated with the uplink transmission before the time t1.

The at least one L1-PL of the new PL-RS associated with the uplink transmission is the L1-PL value corresponding to at least one RS sample of the new PL-RS associated with the uplink transmission at and after the time t1.

In an optional embodiment of the present disclosure, the updated PL-RS parameter information still includes only a piece of PL-RS information, but in order to distinguish the new PL-RS from the old PL-RS, the second PL-RS parameter and the first PL-RS are used.

Example 2: A Method for Fast Updating the PL-RS

It is to be noted that the base station ensures that the number of activated PL-Rs is not greater than a predetermined value.

The base station configures a PL-RS parameter pool for the UE through the RRC signaling, which includes at least one PL-RS parameter.

The base station also configures the PL-RS parameters of uplink channels and signals for the UE through the RRC signaling. The number of different PL-Rs does not exceed the predetermined value, for example, 4.

The base station may update the PL-RS parameters for the uplink transmission of the UE through the MAC CE signaling (i.e. MAC CE).

When the uplink transmission is the PUSCH transmission, the MAC CE signaling indicates the beam state information of the PUSCH, such as the SRI and the association with the PL-RS.

When the uplink transmission is the PUCCH transmission, the MAC CE signaling indicates the beam state information of the PUCCH, such as the spatial-relation of the PUCCH and the association with the PL-RS.

When the uplink transmission is the SRS transmission, the MAC CE signaling indicates the beam state information of the SRS, such as an SRS resource set and the association with the PL-RS.

The base station ensures that the number of activated PL-Rs is not greater than the predetermined value. For example, there are four activated PL-Rs identified by PL-RS IDs 1 to 4, if the PL-RS ID 5 needs to be activated at a certain time, at least one of the PL-RS IDs 1 to 4 needs to be deactivated. Assuming that the PL-RS ID 1 is deactivated, the base station needs to re-associate the uplink transmission associated with the PL-RS ID1 before with a new PL-RS set, such as PL-RS IDs 2 to 5. In this way, the base station maintains that the number of activated PL-Rs of the UE is not greater than the predetermined value.

For the problem in the related art of too much overhead of the MAC CE, when a communication link changes and the beam needs to be switched, it is highly likely that the PL-RS parameters of the uplink transmission need to be replaced. In the related art, the PL-RS parameters need to be updated separately by the MAC CE for different transmissions. For example, for the affected PUSCH transmission, the new PL-RS is configured for one or more SRIs through the MAC CE, including not only the newly activated PL-RS parameters, but also the deactivated PL-RS parameters. For the PUCCH transmission, one or more MAC CEs may also be needed to change the PL-RS parameters for one or more spatial-relations (group) of the PUCCH. For the SRS transmission, one or more MAC CEs may also be needed to change the PL-RS parameters for one or more SRS resource sets.

In addition, when different MAC CEs are sent at different times and the corresponding PL-RSs are consistent, the delays that the PL-RS parameters updated by different MAC CEs take effect are different (the time points of taking effect may be the same or different).

Further, in a Carrier Aggregation (CA) scenario, the actual beams corresponding to the same beam state of the uplink transmission among multiple Component Carriers (CC) may be different, for example, the beam of SRI1 of the PUSCH of CC1 may be different from that of SRI1 of the PUSCH of CC2, so it is not easy to uniformly update the PL-RS parameters of a certain beam state for multiple CCs.

In an optional embodiment of the present disclosure, the base station sends the updated PL-RS parameter information to the UE for updating the PL-RS parameter of the uplink transmission.

The updated PL-RS parameter information includes the following information: the first PL-RS parameter and the second PL-RS parameter. For the predetermined uplink transmissions, the first PL-RS parameter is replaced by the second PL-RS parameter.

The updated PL-RS parameter information is carried through one of the following signaling: the RRC signaling, the MAC CE signaling, and the physical layer signaling.

The uplink transmissions include at least one of the following: the PUSCH transmission, the PUCCH transmission, and the SRS transmission.

The uplink transmission corresponding to the updated PL-RS parameter information is determined in a predetermined or configured (indicated) mode.

Specifically, the predetermined uplink transmissions determined in the predetermined or configured (indicated) mode include one or more or all of the PUSCH transmission, the PUCCH transmission or the SRS transmission.

If the uplink transmission corresponding to the updated PL-RS parameter information is determined in the configured mode, the predetermined uplink transmissions include one or more or all of the PUSCH transmission, the PUCCH transmission or the SRS transmission. The configured (indicated) information is carried through one of the following signaling: the RRC signaling, the MAC CE signaling, and the physical layer signaling.

For example, if the updated PL-RS parameter information indicated by the MAC CE is only used for the PUSCH transmission, the association relationship between the beam state of the PUSCH transmission and the PL-RS parameter which is the same as the first PL-RS parameter included in the MAC CE is replaced by the second PL-RS parameter. It is assumed that association relationships between the beam state of the PUSCH transmission and the PL-RS parameter include: association relationship 1, that is, SRI0 is associated with PL-RS0; association relationship 2, that is, SRI1 is associated with PL-RS1; and association relationship 3, that is, SRI2 is associated with PL-RS2. If the first PL-RS included in the MAC CE updating the PL-RS that the UE receives is PL-RS1, and the second PL-RS is PL-RS4, the result after the MAC CE updates the PL-RS is that the association relation 2 becomes SRI1 is associated with PL-RS4.

For another example, the updated PL-RS parameter information indicated by the MAC CE is used for the PUSCH transmission, the PUCCH transmission and the SRS transmission. It is assumed that association relationships between the beam state of the PUSCH transmission and the PL-RS parameter include: association relationship 1 of the PUSCH, that is, SRI0 is associated with PL-RS0; association relationship 2 of the PUSCH, that is, SRI1 is associated with PL-RS1; and association relationship 3 of the PUSCH, that is, SRI2 is associated with PL-RS2. The association relationships between the beam state of the PUCCH transmission and the PL-RS parameter include: association relationship 1 of PUCCH, that is, the spatial-relation 0 of the PUCCH is associated with PL-RS0; and association relationship 2 of PUCCH, that is, the spatial-relation 1 of the PUCCH is associated with PL-RS1. The association relationships between the SRS and the PL-RS include: association relationship 1 of SRS, that is, the resource set 0 of the SRS is associated with PL-RS0; and association relationship 2 of SRS, that is, the resource set 1 of the SRS is associated with PL-RS1. If the first PL-RS included in the MAC CE updating the PL-RS that the UE receives is PL-RS1, and the second PL-RS is PL-RS4, the result after the MAC CE updates the PL-RS is: association relation 2 of PUSCH, that is, SRI1 is associated with PL-RS4; association relation 2 of PUCCH, that is, the spatial-relation 1 of the PUCCH is associated with PL-RS4; association relation 2 of SRS, that is, the resource set 1 of the SRS is associated with PL-RS4, and other association relationships remain unchanged.

Further, some or all of association relationships of the uplink transmission corresponding to the updated PL-RS parameter information are determined in the predetermined or configured mode.

Further, some or all of association relationships of the uplink transmission on which the updated PL-RS parameter information acts are indicated by one of the following ways: bitmap; N0 association relationships with the minimum index; and N1 association relationships with the maximum index. N0 and N1 are integers greater than or equal to 1.

For example, it is assumed that association relationships between the beam state of the PUSCH transmission and the PL-RS parameter include: association relationship 1 of PUSCH, that is, SRI0 is associated with PL-RS0; association relationship 2 of PUSCH, that is, SRI1 is associated with PL-RS1; and association relationship 3 of PUSCH, that is, SRI2 is associated with PL-RS2.

When some or all of association relationships of the uplink transmission on which the updated PL-RS parameter information acts are indicated by a bitmap, the effective length of the bitmap is 3, indicating whether the association relationships 1 to 3 of PUSCH are affected by the updated PL-RS parameter information. For example, bitmap 010 indicates that the association relationship 2 of PUSCH will be affected by the updated PL-RS parameter information, that is, the first PL-RS parameter in the updated PL-RS parameter information is the same as the PL-RS parameter in the association relationship 2 of PUSCH, and the PL-RS parameter in the association relationship 2 of PUSCH is updated to the second PL-RS parameter. The association relationships 1 and 3 of PUSCH are not affected.

When some or all of association relationships of the uplink transmission on which the updated PL-RS parameter information acts are indicated by N0 association relationships with the minimum index, for example, when N0 is 1, that is, the first PL-RS parameter in the updated PL-RS parameter information is the same as the PL-RS parameter in the association relationship 1 of PUSCH, the PL-RS parameter in the association relationship 1 of PUSCH is updated to the second PL-RS parameter. The association relationships 2 and 3 of PUSCH are not affected.

The cells (also called carriers) or BWPs to which the uplink transmission corresponding to the updated PL-RS parameter information belongs are determined in the predetermined or configured mode.

The cells to which the uplink transmission corresponding to the updated PL-RS parameter information belongs include: cells (group) related to transmission resources of the updated PL-RS parameter information, specific cells (group), configured cells (group), or all activated cells.

The cells (group) related to the transmission resources of the updated PL-RS parameter information include: a cell (group) where the transmission resources of the updated PL-RS parameter information reside, or an uplink cell (group) corresponding to the cell where the transmission resources of the updated PL-RS parameter information reside.

The specific cells (group) include: a primary cell, a primary cell group, a PUCCH cell, a PUCCH cell group, the cell with the minimum index, the cell with the maximum index, the activated cell with the minimum index, and the activated cell with the maximum index.

The configured cells (group) refer to a cell index assigned by the base station to the UE, or information related to a cell index list, which is used for indicating the cell to which the uplink transmission corresponding to the updated PL-RS parameter information belongs.

The BWPs to which the uplink transmission corresponding to the updated PL-RS parameter information belongs include: BWPs related to the transmission resources of the updated PL-RS information and activated BWPs.

The BWPs related to the transmission resources of the updated PL-RS parameter information include: a BWP where the transmission resources of the updated PL-RS parameter information reside, or an uplink BWP corresponding to the BWP where the transmission resources of the updated PL-RS parameter information reside.

According to another aspect of the embodiments of the present disclosure, a storage medium is also provided, in which a computer program is stored. The computer program is configured to execute, when running, the steps in any above method embodiment.

In an embodiment of the present disclosure, the storage medium may be configured to store the computer program for executing the following steps.

At S1, after the PL corresponding to the updated PL-RS parameter information takes effect, or after the beam state corresponding to the updated beam state information takes effect, the relevant parameters of closed-loop power control are reset.

In the embodiment, those of ordinary skill in the art may understand that all or part of the steps in the method of the above embodiments may be performed by hardware related to the terminal devices instructed by a program. The program may be stored in computer readable storage media. The storage media may include: a flash disk, an ROM, an RAM, a magnetic disk or a compact disc.

In the embodiment, those of ordinary skill in the art may understand that all or part of the steps in the method of the above embodiments may be performed by hardware related to the terminal devices instructed by a program. The program may be stored in computer readable storage media. The storage media may include: a flash disk, an ROM, an RAM, a magnetic disk or a compact disc.

The sequence numbers of the embodiments of the present disclosure are adopted not to represent superiority-inferiority of the embodiments but only for description.

If the integrated unit in the above embodiments is implemented by software function modules, and the software function modules are sold or used as independent products, they can also be stored in the computer-readable storage medium. Based on this understanding, the technical solution of the present disclosure substantially or the part making a contribution to the conventional art can be embodied in the form of software product; the computer software product is stored in a storage medium, and includes a number of instructions to make one or more computer devices (which may be a personal computer, a server or a network device, etc.) perform all or part of steps of the method in each embodiment of the present disclosure.

In the above embodiments of the present disclosure, the descriptions of the embodiments focus on different aspects. A part which is not described in a certain embodiment in detail may refer to the related description of the other embodiments.

In some embodiments provided by the present disclosure, it is to be understood that the disclosed device may be implemented in another manner. The device embodiment described above is only schematic, and for example, division of the units is only logic function division, and other division manners may be adopted during practical implementation. For example, multiple units or components may be combined or integrated into another system, or some characteristics may be neglected or not executed. In addition, coupling, direct coupling, or communication connection shown or discussed may be implemented through indirect coupling or communication connection of some interfaces, units or modules, and may be in an electrical form or other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each functional unit in each embodiment of the present disclosure may be integrated into a processing unit, each unit may also physically exist independently, and two or more than two units may also be integrated into a unit. The integrated unit may be realized in form of hardware or in form of software function unit.

The above is only the preferred embodiments of the present disclosure; it should be indicated that, on the premise of not departing from the principles of the present disclosure, those of ordinary skill in the art may also make a number of improvements and supplements, and these improvements and supplements should fall within the protection scope of the present disclosure.

What is claimed is:

1. A parameter resetting method, comprising:
resetting relevant parameters of closed-loop power control after a Path Loss (PL) corresponding to updated Path Loss-Reference Signal (PL-RS) parameter information takes effect, or after a beam state corresponding to updated beam state information takes effect;
wherein the relevant parameters of closed-loop power control comprise a power control adjustment state corresponding to a closed-loop power control index;
wherein determining the closed-loop power control index according to a PL-RS parameter to be activated in the updated PL-RS parameter information or a beam state parameter to be activated in the updated beam state information comprises:
determining the closed-loop power control index according to an association relationship between the PL-RS parameter to be activated and the closed-loop power control index; or determining the closed-loop power control index according to an association relationship between the beam state parameter to be activated and the closed-loop power control index;
wherein the association relationship between the PL-RS parameter to be activated and the closed-loop power control index comprises at least one of the following:
the index of the PL-RS parameter to be activated is associated with the closed-loop power control index;
the index of the PL-RS parameter to be activated and the closed-loop power control index are associated with the same beam state respectively; and
the index of the PL-RS parameter to be activated and the closed-loop power control index are configured in the same association relationship structure;
the association relationship between the beam state parameter to be activated and the closed-loop power control index comprises at least one of the following:
the index of the beam state parameter to be activated is associated with the closed-loop power control index; and
the index of the beam state parameter to be activated and the closed-loop power control index are configured in the same association relationship structure.

2. The method according to claim 1, wherein the updated PL-RS parameter information or the updated beam state information is carried through one of the following signaling: Radio Resource Control (RRC) signaling, MAC Control Element (MAC CE) signaling, and physical layer signaling.

3. The method according to claim 1, wherein determining the closed-loop power control index according to a PL-RS parameter to be activated in the updated PL-RS parameter information or a beam state parameter to be activated in the updated beam state information further comprises:
determining the closed-loop power control index according to the index of the PL-RS parameter to be activated; or
determining the closed-loop power control index according to the beam state parameter to be activated.

4. The method according to claim 1, wherein for Physical Uplink Shared Channel (PUSCH) transmission, the beam state comprises at least one of the following: SRI, or SRI-PUSCH-PowerControl index, and TCI state;
or, wherein the association relationship structure comprises: the association relationship between the SRI-PUSCH-PowerControl index or the TCI state and a power control parameter;
or, wherein for Physical Uplink Control Channel (PUCCH) transmission, the beam state comprises at least one of the following: a spatial-relation of PUCCH, a spatial-relation index of PUCCH, and a TCI state; for the PUCCH transmission, the association relationship structure comprises: the association relationship between the spatial-relation of PUCCH or the TCI state and the power control parameter;
or, wherein the closed-loop power control index is determined by the closed-loop power control index corresponding to the spatial-relation of PUCCH corresponding to the PL-RS parameter to be activated.

5. The method according to claim 1, wherein the PL corresponding to the updated PL-RS parameter information takes effect after a first time if at least one of the following conditions is met:
the total number of the PL-RSs configured is more than X, where X is a positive integer; and the PL-RS parameter to be activated is not the activated PL-RS.

6. The method according to claim 1, wherein the beam state corresponding to the updated beam state information takes effect after a second time.

7. The method according to claim 5, wherein the first time is determined by at least one of the following:

an ACK response to the updated PL-RS parameter information;

the PL-RS to be activated is sent or received at least K times, where K is an integer greater than or equal to 1;

after waiting for time T, wherein the time T refers to one or more predetermined time units, and the predetermined time units comprise at least one of the following: radio frame, sub-frame, time slot, symbol, second, millisecond and microsecond.

8. The method according to claim 6, wherein the second time is determined by at least one of the following:

returning an ACK response after an MAC CE updating the beam state is received;

waiting for time T.

\* \* \* \* \*